(12) United States Patent
Sinden et al.

(10) Patent No.: US 8,353,470 B2
(45) Date of Patent: *Jan. 15, 2013

(54) POWER-ASSISTED DOCKING STATION FOR MOBILE IRRIGATION APPARATUS

(75) Inventors: Joseph D. Sinden, Walla Walla, WA (US); Rex D. Ness, College Place, WA (US); Chad D. Leinweber, Walla Walla, WA (US); Craig B. Nelson, Walla Walla, WA (US)

(73) Assignee: Nelson Irrigation Corporation, Walla Walla, WA (US)

( * ) Notice: Subject to any disclaimer, the term of this patent is extended or adjusted under 35 U.S.C. 154(b) by 201 days.

This patent is subject to a terminal disclaimer.

(21) Appl. No.: 12/711,879

(22) Filed: Feb. 24, 2010

(65) Prior Publication Data

US 2010/0147979 A1 Jun. 17, 2010

Related U.S. Application Data

(63) Continuation of application No. 11/413,029, filed on Apr. 28, 2006, now Pat. No. 7,802,738, which is a continuation-in-part of application No. 10/892,494, filed on Jul. 16, 2004, now Pat. No. 7,140,563, and a continuation-in-part of application No. 10/921,296, filed on Aug. 19, 2004, now Pat. No. 7,300,004.

(51) Int. Cl.
*B05B 3/00* (2006.01)
(52) U.S. Cl. ........................................ 239/722; 239/749
(58) Field of Classification Search .......... 239/722–726, 239/728, 729, 730, 739, 742, 749, 146, 148, 239/161, 159
See application file for complete search history.

(56) References Cited

U.S. PATENT DOCUMENTS

| 738,271 | A | * | 9/1903 | Astle | ............................ 239/723 |
| 1,142,448 | A | | 6/1915 | Lord | |
| 1,651,582 | A | | 12/1927 | Buckner | |
| 1,984,531 | A | | 12/1934 | Kind et al. | |
| 2,122,079 | A | | 6/1938 | Wilson | |

(Continued)

FOREIGN PATENT DOCUMENTS

CA 924353 10/1973

(Continued)

OTHER PUBLICATIONS

European Search Report dated Mar. 13, 2009—Reference 2378-12096—Application No./Patent No. 07008591.5-1260/1849354—Applicant/Proprietor: Nelson Irrigation Corporation.

(Continued)

*Primary Examiner* — Davis Hwu
(74) *Attorney, Agent, or Firm* — Nixon & Vanderhye, P.C.

(57) ABSTRACT

A mobile irrigation apparatus includes a frame assembly supporting at least one sprinkler and adapted for movement in a first direction along a path in a field to be irrigated; a docking station suspended from the frame assembly and adapted to engage and open one or more supply valves in a hydrant located in or adjacent the path for movement in a second direction substantially transverse to the first direction, and at least one power actuator arranged to move the docking station in the second direction in response to at least one sensor to thereby facilitate lateral alignment of the docking station with the hydrant.

16 Claims, 9 Drawing Sheets

U.S. PATENT DOCUMENTS

| | | |
|---|---|---|
| 2,474,071 A | 6/1949 | Stetson |
| 2,750,228 A | 6/1956 | Engel |
| 3,255,968 A | 6/1966 | Stafford |
| 3,321,138 A | 5/1967 | Curry |
| 3,444,941 A | 5/1969 | Purtell |
| 3,463,175 A | 8/1969 | Rogers |
| 3,575,200 A | 4/1971 | Imeson |
| 3,592,220 A | 7/1971 | Reinke |
| 3,608,827 A | 9/1971 | Kinkead |
| 3,679,135 A | 7/1972 | Grosch |
| 3,710,818 A | 1/1973 | Imeson |
| 3,729,016 A | 4/1973 | Von Linsowe |
| 3,729,141 A | 4/1973 | Cornelius |
| 3,741,238 A | 6/1973 | Lacey |
| 3,908,692 A | 9/1975 | Laureau |
| 3,970,102 A | 7/1976 | Harvey |
| 3,972,477 A | 8/1976 | Laureau |
| 3,984,052 A | 10/1976 | Di Palma |
| 4,003,519 A | 1/1977 | Kruse et al. |
| 4,036,436 A | 7/1977 | Standal |
| 4,182,493 A | 1/1980 | Murray |
| 4,192,335 A | 3/1980 | Standal |
| 4,204,642 A | 5/1980 | Hunter |
| 4,240,461 A | 12/1980 | Harvey |
| 4,252,275 A | 2/1981 | Standal |
| 4,265,404 A | 5/1981 | Hunter |
| 4,274,584 A | 6/1981 | Noble |
| 4,295,607 A | 10/1981 | Noble |
| 4,350,295 A | 9/1982 | Gheen |
| 4,352,460 A | 10/1982 | Purtell |
| 4,412,655 A | 11/1983 | Noble |
| 4,413,783 A | 11/1983 | Ostrom et al. |
| 4,421,274 A | 12/1983 | Noble |
| 4,442,974 A | 4/1984 | Noble |
| 4,442,976 A | 4/1984 | Noble |
| 4,467,962 A | 8/1984 | Noble |
| 4,489,888 A | 12/1984 | Rinkewich |
| 4,522,338 A | 6/1985 | Williams |
| 4,553,699 A | 11/1985 | Bengtsson |
| 4,561,459 A | 12/1985 | Jackmann |
| 4,682,736 A | 7/1987 | Wieck |
| 4,730,773 A | 3/1988 | Meyer |
| 4,809,910 A | 3/1989 | Meyer |
| 4,842,204 A | 6/1989 | Debruhl, Jr. |
| 4,877,189 A | 10/1989 | Williams |
| 5,080,290 A | 1/1992 | Ostrom |
| 5,340,078 A | 8/1994 | Dean |
| 5,810,051 A | 9/1998 | Campagna et al. |
| 6,125,868 A | 10/2000 | Murphy et al. |
| 6,293,475 B1 * | 9/2001 | Sobolik .................... 239/168 |
| 6,431,475 B1 | 8/2002 | Williams |
| 7,300,004 B2 | 11/2007 | Sinden et al. |
| 7,510,132 B2 | 3/2009 | Sinden et al. |
| 2005/0077401 A1 | 4/2005 | Sinden et al. |
| 2006/0011753 A1 | 1/2006 | Sinden et al. |

FOREIGN PATENT DOCUMENTS

| | | |
|---|---|---|
| EP | 0008182 | 2/1980 |
| EP | 1044496 | 10/2000 |
| FR | 561667 | 10/1923 |
| WO | 8700724 | 2/1987 |

OTHER PUBLICATIONS

Supplementary European Search Report dated Nov. 27, 2009 of EP Application No. 05769148, 1 page.

Database WPI Week 198047, Thomson Scientific, London GB; AN, 1980-L2970C, XP002557774 & SU 727 181A (Raduga), Apr. 25, 2980, 1 page.

Sinden et al., entitled "Power-Assisted Docking Station for Mobile Irrigation Apparatus", U.S. Appl. No. 11/413,029, filed Apr. 28, 2006, pending.

* cited by examiner

POWER-ASSISTED DOCKING STATION FOR MOBILE IRRIGATION APPARATUS

This application is a continuation of application Ser. No. 11/413,029 filed Apr. 28, 2006 (now U.S. Pat. No. 7,802,738) which is a continuation-in-part of application Ser. No. 10/892,494 filed Jul. 16, 2004 (now U.S. Pat. No. 7,140,561) and application Ser. No. 10/921,296, filed Aug. 19, 2004 (now U.S. Pat. No. 7,300,004), which are incorporated herein by reference.

BACKGROUND OF THE INVENTION

This invention relates to mobile irrigation apparatus including traveling sprinklers and linear water feed machines and, more specifically, to an associated docking station that automatically and successively engages and disengages spaced hydrants mounted on a water supply pipe extending alongside or through a field to be irrigated.

Mobile irrigation systems are well-known and include traveling sprinklers, center-pivot machines, linear machines and the like. For some traveling sprinklers and linear machines, there is a requirement to successively engage and disengage valves in hydrants or risers spaced along the length of a water supply pipe that typically parallels or coincides with the path of movement of the sprinkler or linear machine. In commonly owned co-pending application Ser. No. 10/921,296, filed Aug. 19, 2004, a traveling sprinkler is disclosed that incorporates a docking station for automatically engaging and disengaging the valves. In commonly owned co-pending application Ser. No. 10/892,494, filed Jul. 16, 2004, a linear-feed machine is disclosed that incorporates a similar docking station.

BRIEF DESCRIPTION OF THE INVENTION

This invention relates to an improved automatic docking station (ADS) that can be utilized with linear irrigation machines, traveling sprinklers or other mobile irrigation devices (generically referred to herein as "mobile irrigation apparatus" or, in some cases, simply "mobile apparatus"). The ADS is supported and controlled so as to reliably and effectively capture each hydrant, open the hydrant water-supply valve to permit water to be supplied to the one or more sprinklers on the mobile apparatus, close the valve, and then disengage from the hydrant for movement with the mobile apparatus to the next hydrant. The ADS also minimizes the load placed on the hydrant, thus permitting a simpler main supply line construction.

In the exemplary embodiment, the ADS per se is formed by a pair of housings sandwiched about a hydrant valve actuator. The two housings support multiple pairs of guide wheels adapted to engage a round plate or flange on the hydrants. The housings also support docking stops and related mechanical and electrical hardware for halting the movement of the mobile apparatus and docking station when properly aligned with the hydrant valve, opening and closing the valve, and subsequently permitting the resumption of movement of the mobile apparatus after the allotted (programmed) sprinkling time has expired. The ADS is resiliently suspended, or hung, from a supporting frame that, in turn, supports related hydraulic and electrical hardware as described in further detail below.

Two pair of vertically-oriented, angled guide wings, respectively mounted on the front and back of the ADS supporting frame, are used to achieve lateral alignment of the ADS with the hydrant, while one pair of horizontally-oriented front and back guide wings are used to achieve vertical alignment with the hydrant. In this regard, the ADS is operable in opposite forward and rearward directions of movement of the mobile apparatus, with no change or adjustment in any of the component parts. For purposes of this application, therefore, any use of "front" or "forward," etc. is intended to refer to the ends of the mobile apparatus, ADS, etc. that lead in the direction of initial movement of the apparatus, i.e., along a path, for example, path $P_1$, as shown in FIG. 1. Use of "back" or "rearward," etc. is intended to refer to the opposite ends of the mobile apparatus, ADS, etc. that trail in the movement along the path $P_1$, but that lead in movement in the opposite direction along the path $P_2$, also shown in FIG. 1.

To ensure consistent and effective hydrant engagement via interaction with the above-described guide wings, the ADS is also arranged and supported so as to permit several degrees of movement relative to the mobile irrigation apparatus on which it is carried. More specifically, 1. The ADS is resiliently suspended or hung from its supporting frame by elongated coil springs (or equivalents) extending vertically between the ADS and the ADS supporting frame to enable up and down or vertical movement, but also to facilitate front-to-back, side-to-side and compound movements, i.e., tilting and twisting movements.

2. Spring-loaded, compressible tie rods, or equivalents, extend horizontally between the supporting frame and ADS utilizing swivel bushings to enable front-to-back horizontal movement, but also to facilitate the limited vertical, side-to-side and compound movement, i.e., tilting and twisting movements.

3. The ADS and its supporting frame are also movable laterally along a pair of rails extending perpendicularly to the path of movement of the mobile irrigation apparatus so as to permit a wide range of lateral adjustment to accommodate a similarly wide range of hydrant misalignment situations.

When used with a linear water feed machine, in addition to movements that relate to hydrant capture, the ADS is movable to any number of positions along a side beam secured to one side of a drive tower of the linear machine. This allows for manual or automatic adjustment of the water distribution patterns between the forward and return movements of the linear machine along the paths $P_1$ or $P_2$, or for subsequent forward and/or rearward movements along the paths as more fully described in the pending '494 application.

This invention provides further improvements to the ADS that may be employed in mobile irrigation apparatus including but not limited to the traveling sprinkler and linear feed machines described in the above-identified prior pending applications. One such improvement relates to the addition of hydraulic assist capability to facilitate movement of the ADS into alignment with the target hydrant, which is particularly useful when the ADS is incorporated into a linear-feed machine.

The hydraulic assist feature in the exemplary embodiment is a hydro-electric system that uses hydraulic (or equivalent) actuators in lieu of the existing spring-bias arrangements to thereby more quickly move the ADS laterally and/or vertically into alignment with the hydrant. Side guide and height guide sensors are used to provide inputs to the relevant hydraulic actuators. These sensors can be sensi-switches, proximity switches, limit switch assemblies, optical switches, or any other suitable devices known to those skilled in the art of sensor design.

An example of how the hydraulic assist feature might be used follows. When a side guide sensor mounted on one of the vertically-oriented forward guide wings receives an input (i.e., when the sensor is struck by the hydrant flange as the ADS approaches), a programmable logic controller (PLC) on the mobile apparatus will activate horizontally-oriented hydraulic actuators to move the ADS laterally along the transversely oriented rails in a direction that will remove the sensor input. Thus, if a sensor on the right side guide wing is engaged by the hydrant flange, the horizontal actuators will move the ADS to the right until the right side guide sensor no longer senses the hydrant flange. This occurs when the ADS is more substantially fully aligned with the hydrant flange (previously, the ADS moved laterally due only to physical contact and a resulting spring-biased camming action along a surface of the closest guide wing). As the mobile apparatus moves forward, a height guide sensor will also sense the hydrant if the ADS is below the hydrant flange. If the height guide sensor receives this input, the PLC will activate a pair of vertically-oriented hydraulic actuators which are located laterally adjacent the valve actuator on the ADS and which will raise the ADS to vertically align the ADS with the hydrant flange. The vertically-oriented hydraulic actuators can be actuated in unison or independently to adjust for hydrant flange or riser tilt. To operate the actuators independently, however, separate sets of height guide sensors would be required.

Another improvement disclosed herein relates to a simplified dock stop mechanism that halts the linear movement of the mobile apparatus when a rearwardly located stop on the ADS engages the forward edge of the hydrant flange, and with the valve actuator on the ADS vertically aligned with the water supply valve in the hydrant. Note in this regard that the forward edge of the hydrant flange is the edge first "seen" or encountered by the ADS. More specifically, the new dock stop mechanism consists of two double-acting hydraulic actuators mounted in trunnion swivel nuts that are attached to the main water valve actuator housing. One such cylinder is mounted on the forward end of the ADS and the other on the rearward end of the ADS. The actuators are extended and retracted hydraulically via signals from the PLC. The actuators raise and lower the ADS stop levers. Each stop lever houses a dock stop proximity switch which tells the PLC when to stop the mobile apparatus and initiate a watering cycle. The proximity switch is tripped when the flange is within a few millimeters of the rearward stop (the forward stop remains retracted during forward movement of the mobile apparatus), and the mobile apparatus will then "coast" into engagement with the rearward stop. Each actuator has two Hall-effect magnetic switches (or equivalents) that indicate the fully extended and fully retracted piston positions. These are used to provide the PLC with information regarding actuator position. The fully extended magnetic switch is also used as a back-up shut-down switch if the mobile apparatus does not stop on its dock stop. Forward movement of the stop lever will force it up and over the hydrant flange, and this will cause the actuator piston to move up and turn the magnetic switch off, signaling the PLC to shut down the mobile apparatus.

Still another improvement relates to the addition of a stop-sensor-strip (or other suitable sensor) to the forward edges of the generally horizontally-oriented, front and back guide wings. Each stop-strip serves to shut down the entire mobile apparatus by light contact with any object. This stop-strip will, among other things, prevent the ADS from breaking a hydrant and/or riser if the flange is higher than the ADS. The stop-strip is flexible and compressible, and thus can also be used by the operator (or anyone in proximity to the mobile apparatus) as a quick shutdown switch. Specifically, only a slight squeeze of the strip is all that is required to shut down the mobile apparatus. This arrangement also provides protection from field obstructions as well as safety to humans and animals in the path of travel of the mobile apparatus. Additional safety features may be employed as desired. For example, emergency stop buttons may be located on the ADS frame where they can be easily accessed by anyone in close proximity to the apparatus.

The improvements described herein also include the incorporation of a separate hydraulic system for operating the various ADS actuators and for opening the riser valve. In the earlier above-identified applications, water from the irrigation supply pipe was used as the control medium.

Accordingly, in one aspect, the invention embodiment relates to a mobile irrigation apparatus comprising a frame assembly supporting at least one sprinkler and adapted for movement in a first linear direction along a path in a field to be irrigated; a docking station suspended from the frame assembly for movement in a first lateral direction substantially transverse to the first linear direction, and adapted to engage and open a supply valve in a hydrant located in or adjacent the path; and at least a first lateral alignment power actuator arranged to move the docking station in the second direction in response to at least one lateral alignment sensor to thereby facilitate lateral alignment of the docking station with the hydrant.

In another aspect, the invention relates to a mobile irrigation apparatus comprising a wheel-mounted frame assembly supporting at least one sprinkler operated by a main control valve and adapted for movement in a specified direction along a path in a field to be irrigated; a hydrant docking station resiliently suspended from a frame, the docking station incorporating a valve actuator adapted to open a valve in a water hydrant located along the path; a first substantially horizontal guide wing extending forwardly of and angling upwardly away from the docking station; a second substantially horizontal guide wing extending rearwardly of and angling upwardly away from the docking station; and at least one power actuator arranged to move at least one side of the docking station in a vertical direction relative to the docking station frame in response to a height guide sensor mounted on the first substantially horizontal guide wing.

In still another aspect, the invention relates to linear water feed apparatus for use in agricultural irrigation comprising a wheel-mounted truss assembly supporting a plurality of individual sprinklers and adapted for movement in a specified direction across a field to be irrigated, the truss assembly oriented transverse to the specified direction; a supply pipe arranged in the specified direction along or within the field to be irrigated, the supply pipe mounting a plurality of water supply hydrants at spaced locations along the pipe, each of the hydrants enclosing a water supply valve; and a docking station supported on a first frame that is attached to an end of the truss assembly closest to the supply pipe, and adapted to engage and open successive ones of the water supply valves in the plurality of hydrants; wherein the docking station is supported for at least linear, vertical and lateral movement relative to the truss assembly, at least the vertical and lateral movement implemented by plural power-assist actuators.

The invention will now be described in connection with the drawings identified below.

DETAILED DESCRIPTION OF THE INVENTION

Figure 1:
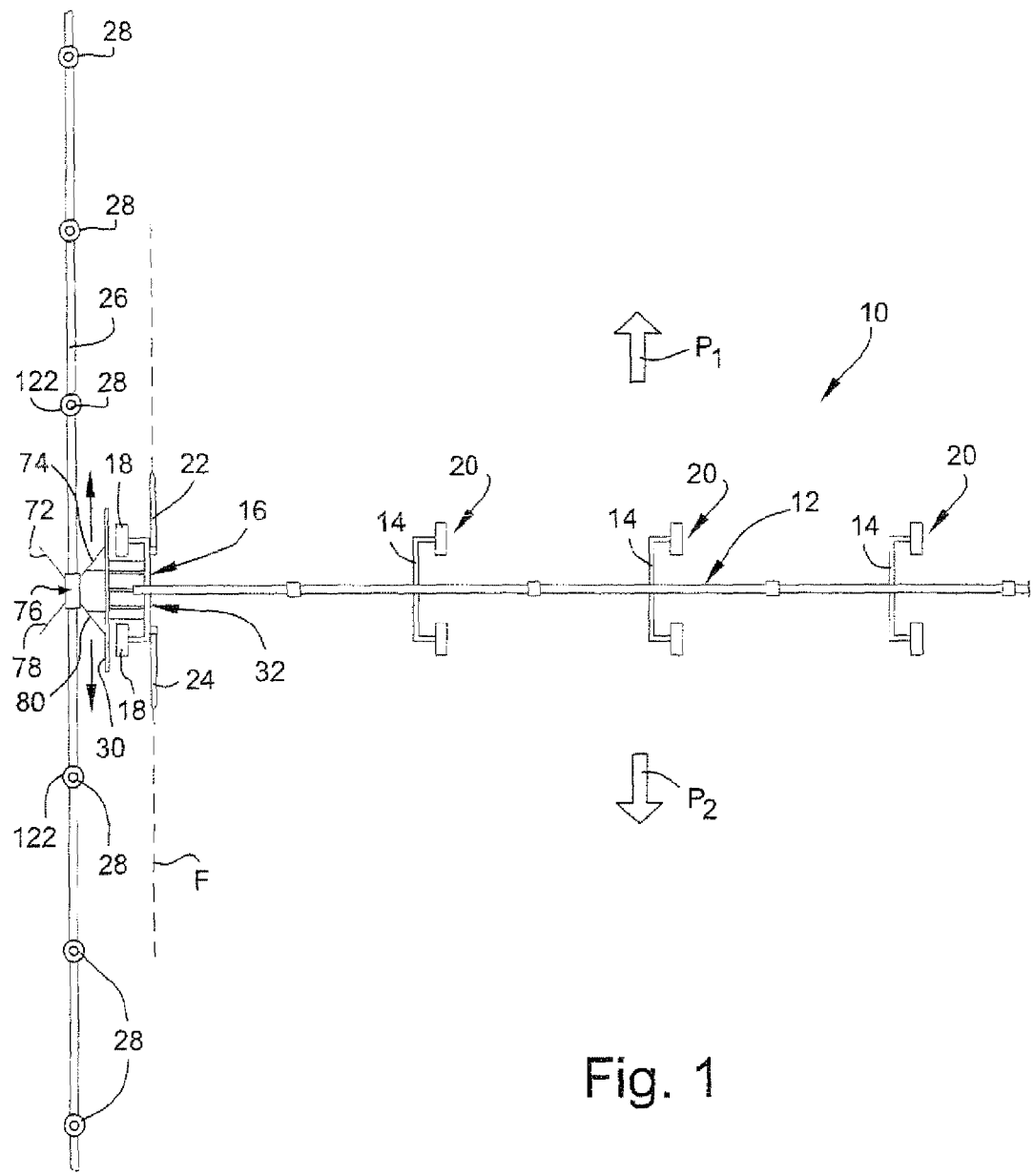
FIG. 1 is a schematic plan view of a linear-move machine incorporating a docking station in accordance with the subject invention.

With reference initially to FIG. 1, a typical linear-feed irrigation machine 10 is schematically illustrated that will serve as the primary frame of reference for the description of the improved docking station or ADS, but it will be understood that the improvements described herein are equally applicable to traveling sprinklers or carts as described in the '296 application identified above, and other mobile apparatus.

The linear move machine as illustrated includes a main truss assembly 12 supported by several wheeled towers 14 for movement in a forward direction along a linear path $P_1$, or in a rearward direction along an opposite linear path $P_2$. These paths extend perpendicularly to the truss assembly 12, and parallel to a water supply pipe 26. A drive tower 16 typically supports a generator (not shown) for supplying power to the drive wheels 18. In an end-feed arrangement, the drive tower is located at one end of the truss, at one side of the field, and the supply pipe 26 runs along that side of the field. Separate electric motors (also not shown) are often attached to the remaining towers 14 for driving the respective wheel pairs 20 as needed to maintain alignment with the drive tower 16 and associated drive wheels 18. Other drive arrangements including the utilization of battery power and/or electric or hydraulic drive motors connected to a power source by a cable could be employed.

Guide booms 22, 24 extend in opposite directions from the drive tower 16 (parallel to the paths $P_1$ and $P_2$), and are engaged in a guide furrow F adjacent and parallel to the supply pipe 26 to thereby guide and maintain the machine in the desired path. Typically, if the guide booms stray laterally from the furrow beyond a predetermined limit, the machine will shut down. Other guide arrangements, including booms engaged with the water supply pipe, or the use of electronic and/or optical sensors, wire, GPS, etc. may be utilized as well.

The water supply pipe 26 is fitted with spaced hydrants 28 that supply water to the machine 10 via a distribution pipe (not shown) running along, on or within the truss assembly 12, and ultimately to the sprinklers (not shown) suspended from the truss assembly 12, at spaced locations therealong. The supply pipe 26 is shown above ground, but may be underground, with only the hydrants 28 exposed. It will be understood that the supply pipe 26 is typically laid out consistently with the desired path of the machine. For linear machines as described herein, the guide furrow F may be formed alongside and parallel to the pipe 26, while for some traveling sprinklers, the pipe 26 itself will guide and thus define the path of travel. The linear-move machine as described is generally well-known, and this invention relates primarily to the manner in which the attached ADS 76 engages and disengages the hydrants 28.

In connection with the further description of the ADS and related hardware, the various drawing figures have been simplified via omission of details for the sake of clarity and ease of understanding. For example, in some views, certain structure not necessary for understanding the text relating to these views has been omitted. In addition, wiring and other minor details that would otherwise clutter the drawings, but that are nevertheless well understood by those of ordinary skill in the art, have also been omitted.

Figure 2:
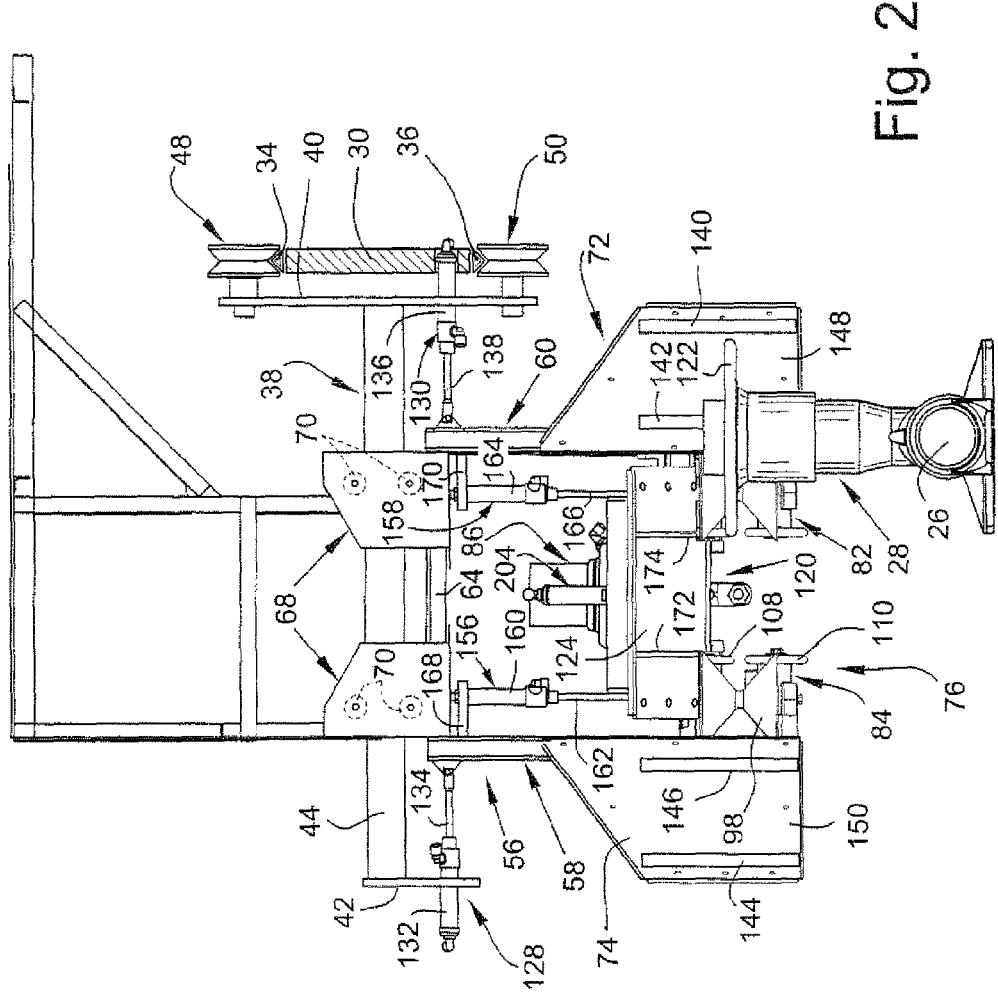
FIG. 2 is a partial front elevation view of a docking station of a linear-move machine in accordance with the invention, approaching a laterally misaligned hydrant.
Figure 4:
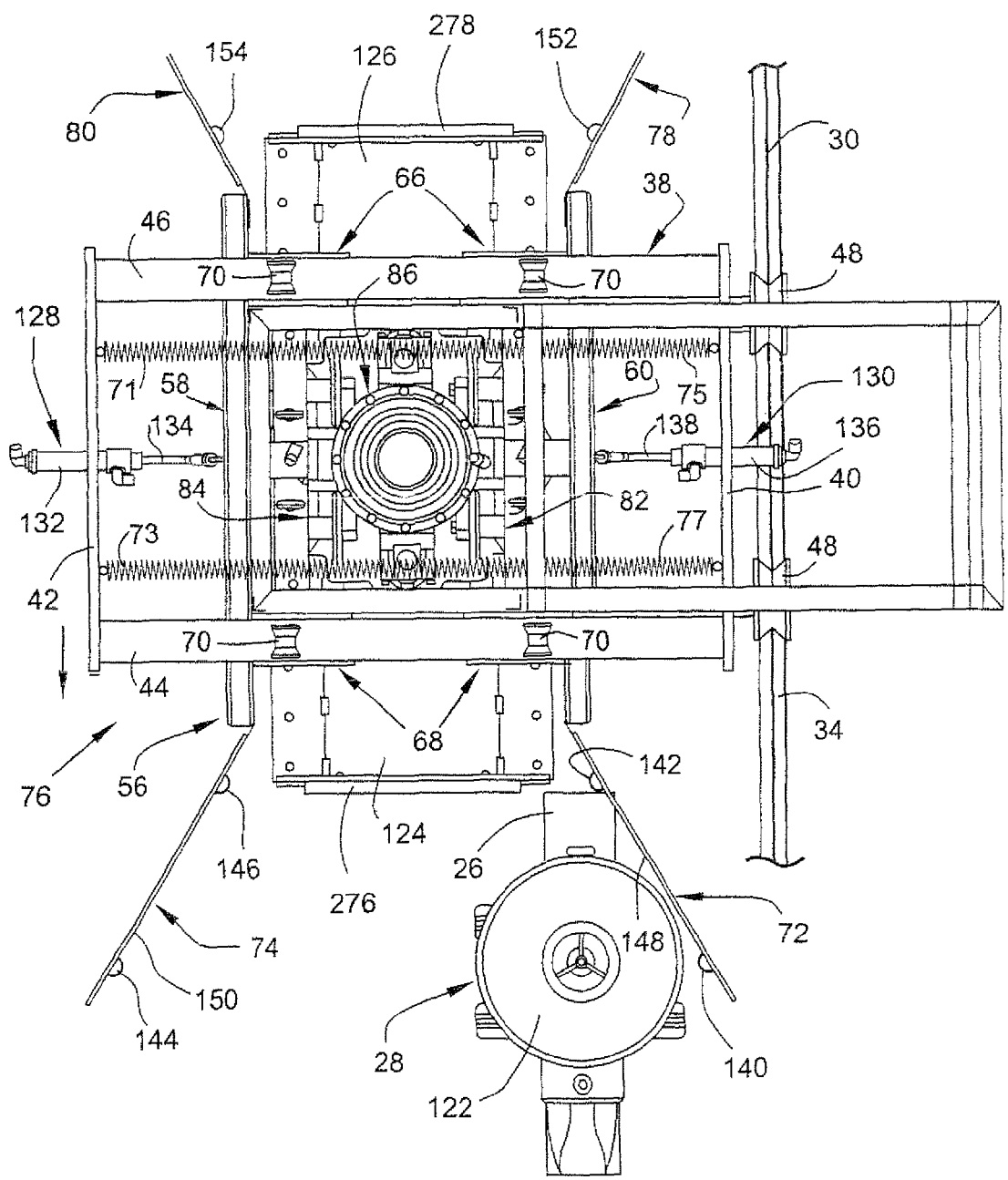
FIG. 4 is a plan view of the docking station and hydrant illustrated in FIG. 2.

In an exemplary embodiment, and with specific reference also to FIGS. 2 and 4, a rigid side beam 30 is bolted or welded (or otherwise suitably secured) to an existing frame 32 (FIG. 1) of the drive tower 16, such that the beam 30 extends substantially parallel to the water supply pipe 26, and to the direction of movement of the linear-move machine. Side beam 30 may be, for example, a solid or hollow box-beam, but in any event, the beam is provided with inverted V-shaped rails 34, 36 along upper and lower edges of the beam, running substantially the entire length of the beam. The purpose of beam 30 will be explained further below, and additional details may be found in the '494 application identified above.

The ADS 76 in accordance with one embodiment of the invention, includes a trolley, a supporting frame and the docking station per se that moves with the trolley. As best seen in FIGS. 2 and 4, the trolley 38 includes a pair of metal plates (or similar) 40, 42 connected by a pair of round (e.g., 2 in. dia.) pipes or rails 44, 46 (or other suitably rigid members) extending laterally away from the side beam 30. The larger plate 40 is located adjacent the side beam, and mounts an upper pair of rollers 48 and a lower pair of rollers 50 that permit the trolley 38 to roll along the V-shaped rails 34, 36 of the side beam 30 to any desired location along the length of the side beam. Simple pins or bolts (not shown) in combination with holes in the beam (or any other suitable mechanical, hydraulic, pneumatic or electric locking device), provide a reliable locking arrangement for securing the trolley, and hence the ADS, at desired locations along the side beam 30. The trolley could also be supported by other means, for example, slide plates coated with low friction material or the like.

Again, with reference especially to FIGS. 2 and 4, the ADS supporting frame 56 is carried on the trolley 38 and includes a pair of inverted, laterally-spaced, U-shaped subassemblies 58, 60 (also see FIG. 3) that are connected at their upper ends by spaced frame members (one shown in FIG. 2) that, in turn, support two pairs of roller mounting flanges 66, 68, each flange pair mounting two rollers 70 such that the supporting frame 56 is movable laterally, in a direction perpendicular to the paths $P_1$ and $P_2$ (FIG. 1), along the trolley pipes or rails 44, 46 between plates 40, 42. This arrangement provides a lateral adjustment feature for the ADS relative to the side beam 30 (and hydrants 28) as described further herein. Thus, for this embodiment, the ADS is adjustable both linearly and laterally relative to the machine. For other mobile apparatus, such as a traveling sprinkler cart, the beam 30 could be omitted, and the trolley 38 otherwise fixed to the apparatus for lateral adjustment only of the ADS along the pipes or rails 44, 46.

As best seen in FIG. 4, a pair of horizontally oriented coil springs 71, 73 are connected between the outer plate 42 and the inner U-shaped subassembly 60, while a second pair of horizontally-oriented coil springs 75, 77 extend between the inner plate 40 and the outer U-shaped subassembly 58. This arrangement maintains the docking station 76 in a generally centered position along the trolley rails 44, 46 (between plates 40 and 42), but also permits reciprocatory spring-biased movement of the docking station 76 in opposite directions along the rails. Thus, the docking station 76 is able to accommodate various degrees of misalignment of any one or more of the hydrants 28 as described further herein. Lateral movement of the docking station 76 to enable capture of a misaligned hydrant is also enabled by front and rear pairs of substantially vertical guide wings, best seen in FIGS. 2-4. Specifically, a first pair of guide wings 72, 74 are fixed to respective forward ends of subassemblies 58, 60 and extend forwardly of the docking station 76, flaring outwardly in the forward direction. A second pair of guide wings 78, 80 are fixed to respective rearward ends of subassemblies 58, 60 and extend rearwardly of the docking station 76, also flaring outwardly but in the rearward direction. The manner in which the vertical guide wings laterally align the ADS with the hydrant will be explained further herein.

Figure 5:
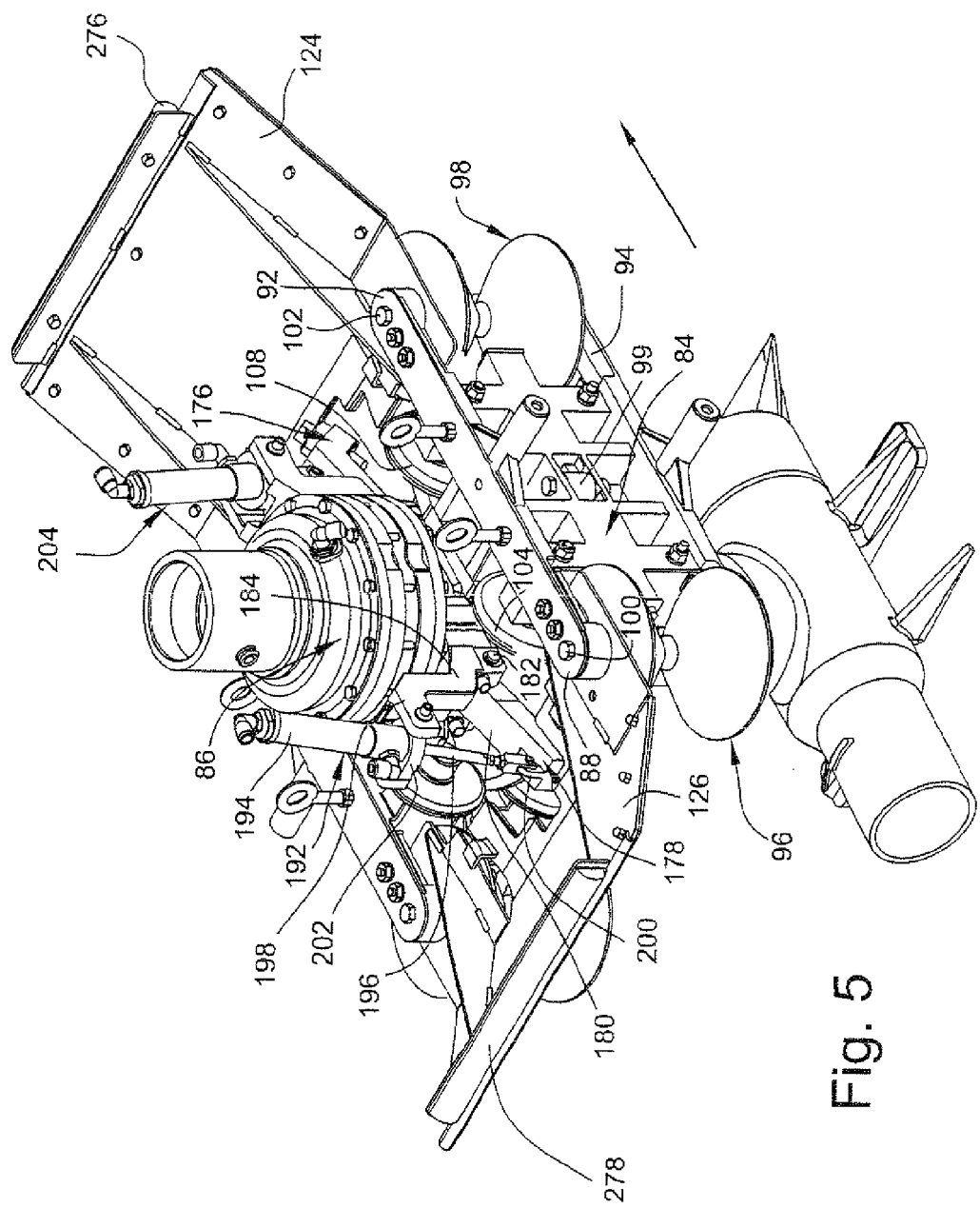
FIG. 5 is a partial respective view of the docking station in accordance with an exemplary embodiment of the invention, with side guides removed and in docked position.
Figure 6:
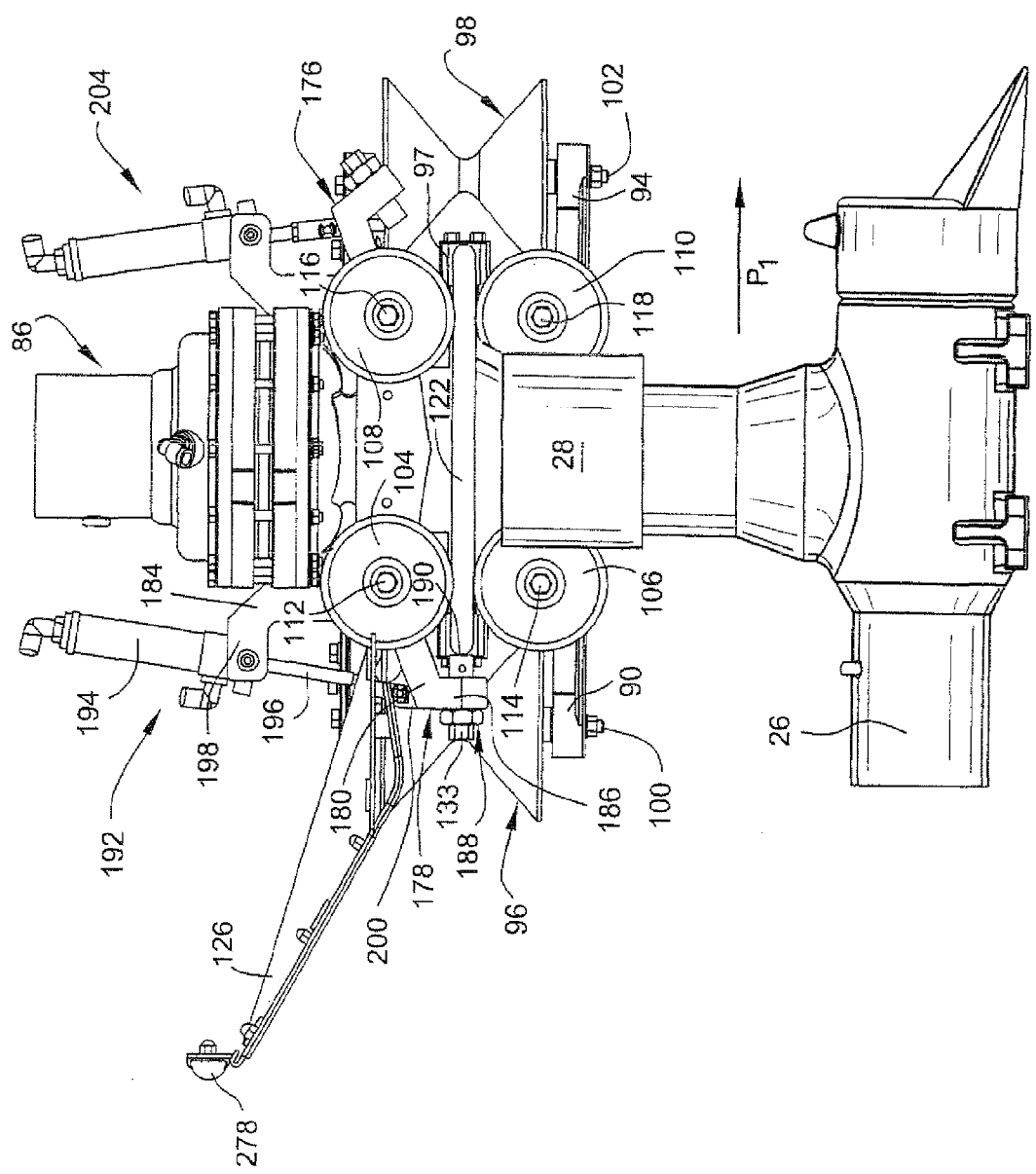
FIG. 6 is a side elevation of the docking station shown in FIG. 5 but with side guides on the forward guide and portions of the housing removed.
Figure 7:
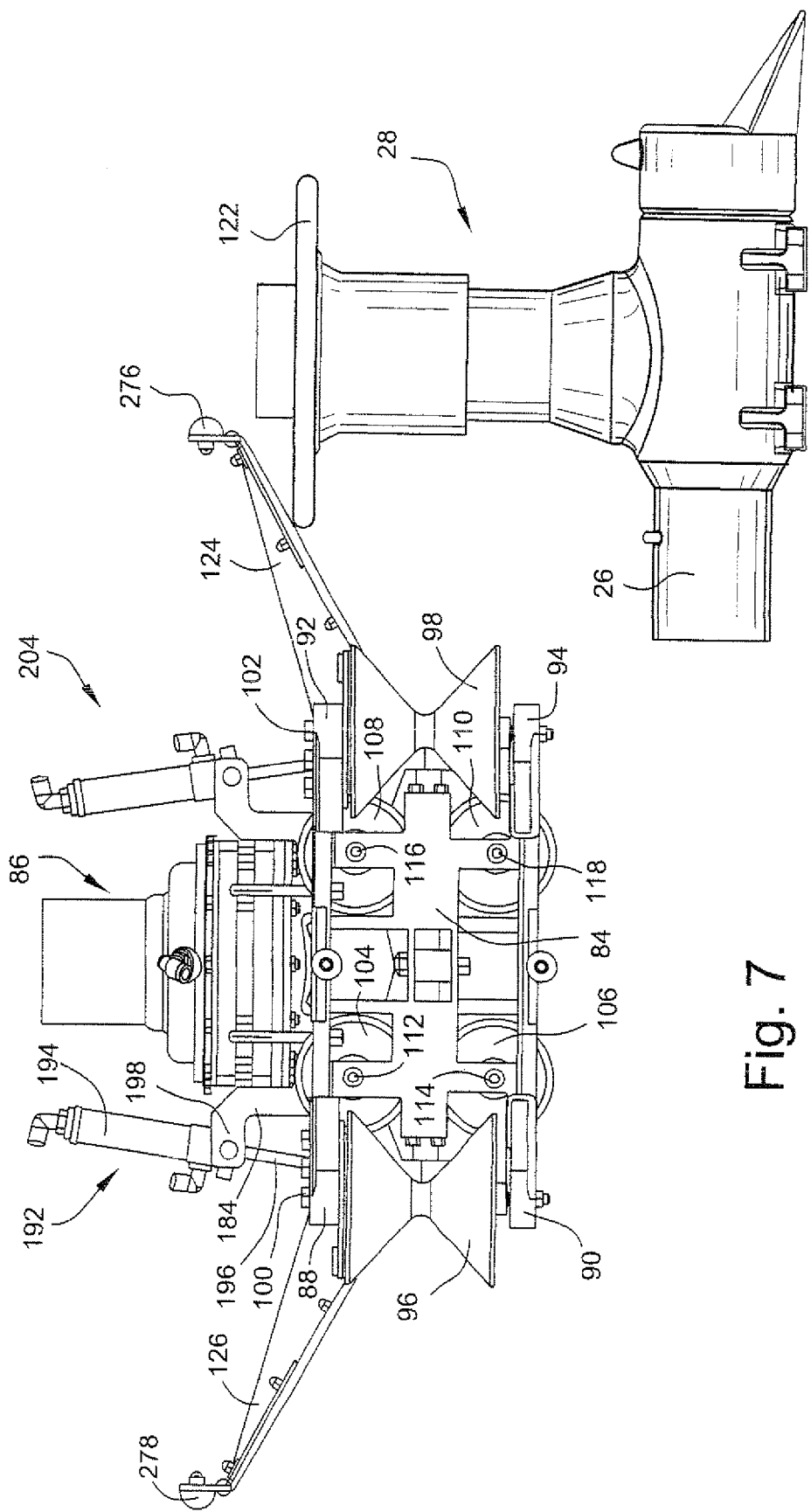
FIG. 7 is a side elevation similar to FIG. 6 but with forward and rearward guides removed, front and back guides in place, and upstream of a hydrant.
Figure 8:
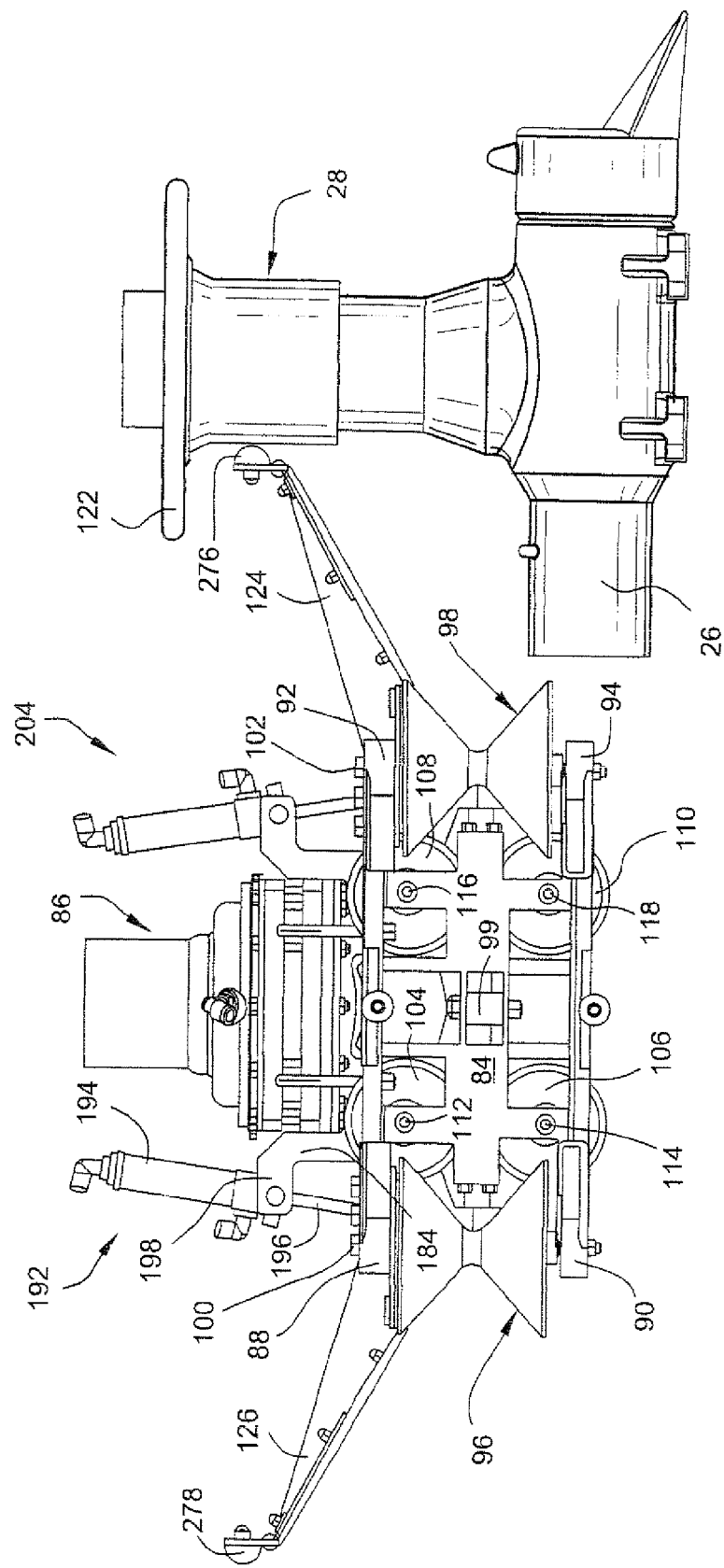
FIG. 8 is a side elevation similar to FIG. 7 but with a more severe vertical misalignment with the hydrant.

The docking station itself, indicated at 76, includes a pair of housings 82, 84 on either side of, i.e., sandwiched about, a hydrant valve actuator assembly (FIGS. 1-4). Since the housings 82, 84 are identical to one another, only housing 82 will be described in any degree of detail. As best seen in FIGS. 5, 7 and 8, housing 84 includes a main body portion with two pairs of oppositely directed flanges 88, 90 and 92, 94, each flange pair supporting between them a respective generally hourglass-shaped V-track roller 96, for rotation about a vertical axis defined by pivot pins or bolts 100, 102. The main body portion of housing also supports two pair of vertically aligned guide wheels 104, 106 and 108, 110 for rotation about horizontal axes indicated by bolts 112, 114, 116 and 118, respectively. The pairs of guide wheels are supported axially between the V-track rollers 96, 98, on the inner side of the housing 84. An additional pair of idler rollers (not shown) may be mounted on each housing, but they are merely optional, not required. An open channel member 97 (see FIG. 6) is fixed to the inner side of the housing 82, vertically centered between the guide wheels 104, 106, 108 and 110. The open side of the channel faces inwardly, creating a slot that receives one side of the hydrant flange 122 as shown in greater detail in the '494 and '296 applications. A vertically mounted side guide roller 99 (FIG. 5) is fixed to the housing and partially protrudes through apertures in the housing and in the channel member 97 for engagement with the flange 122. Thus, when housings 82, 84 are assembled on either side of the valve actuator assembly 86, a passageway or docking space 120 (FIG. 2) is defined by the two laterally opposed pairs of V-track rollers 96, 98 at the front and back of the docking station, the channel members 97 and the two pairs of laterally opposed guide wheels (104, 106) and (108, 110) located axially between the two pairs of V-track rollers on each housing 82, 84. This passageway 120 is located below the hydrant valve actuator assembly 86, and is generally sized and shaped to receive the flange 122 on the hydrant 28 as also described further below.

Also fixed to the housings 82, 84 are a pair of generally horizontally-oriented guide wings 124, 126 (FIGS. 2-8). The guide wings 124 and 126 are secured to the housings 82, 84 by means of bolts, spot welds or any other suitable means. Wing 124 projects outwardly and upwardly in a forward direction, while wing 126 projects outwardly and upwardly in a rearward direction. These horizontal guide wings serve to vertically adjust the ADS and they work in concert with guide wings 72, 74 and 78, 80 to fully align the docking station 76 with the hydrants 28.

More specifically, the vertically-oriented wing pairs 72, 74 and 78, 80 are designed to be engaged by the hydrant flange 122 when the hydrant is misaligned in a lateral direction, causing the docking station 76 to move laterally along the trolley rails 44, 46 in a direction dependent upon which of the guide wings is engaged, and against the centering bias of springs 71, 73. The horizontally-oriented wings 124, 126 are especially designed to assist in adjustment of the docking station 76 to a hydrant 28 that is slightly higher than a desired optimum height, i.e., when the flange 122 is higher than the passageway or docking space 120 as shown in FIG. 7. Thus, when wing 124, for example, engages a hydrant flange 122, it will cause the docking station to crawl upwardly over the flange 122 so that the flange can be engaged by one or more of the V-track rollers 96, 98. The V-track rollers 96, 98 will also cam the docking station 76 in a direction that brings the docking station to a position where the flange 122 is located in the center of the V-track rollers 96, 98 as best seen in FIG. 6. Note that the profile at the narrow center of the V-track rollers 96, 98 complement the rounded profile of the peripheral edge of the flange (FIG. 2). It will be appreciated that the horizontal and vertical guide wings 72, 74, 78, 80, 124 and 126 as well as the V-track rollers work in concert with the resilient, floating suspension of the ADS as described further herein to achieve the desired alignment with the successive hydrants along the supply pipe.

The docking station 76 itself is suspended or hung from the supporting frame 56 so as to allow the docking station to "float" to a limited extent in essentially any direction to facilitate capture of the hydrant, as more fully explained in the '494 and '296 applications.

Briefly, the arrangement described in those applications, the docking station 76 "floats" relative to its supporting frame 56 for movement in at least three mutually perpendicular directions, i.e., vertical, horizontal front-to-back (and vice versa), and horizontal side-to-side. In addition, limited compound movements, i.e., tilting, swiveling and combinations thereof, are also possible by reason of the flexible nature of the vertically-oriented springs in combination with the tie-rod universal mounting arrangements. These multiple degrees of freedom of movement, in combination with the lateral adjustment enabled by the trolley 38, permit reliable and accurate docking with hydrants 28 even when the latter are out of alignment relative to the docking station.

The improved ADS in accordance with this invention also incorporates hydraulic-assist devices to enable more rapid response of the ADS to severely misaligned hydrants. In this regard, a pair of power actuators 128, 130 (FIGS. 2, 4) are arranged between frame members of inverted U-shaped subassemblies 58, 60 and plates 40, 42, respectively. Actuators 128, 130 may be hydraulic piston/cylinder assemblies as shown or other equivalent electrical or pneumatic actuators. Actuator 128 includes a cylinder 132 fixed to plate 42 and piston 134 fixed to the inverted U-shaped subassembly 58. Similarly, actuator 130 includes a cylinder 136 fixed to plate 40 and a piston 138 fixed to the inverted U-shaped subassembly 60. As shown in FIG. 2, it will be appreciated that beam 30 may be formed with an elongated slot to accommodate movement of the actuator 130 with the ADS 76 along the beam. Alternatively, plate 40 could be extended below guide roller 50 to provide needed space to mount the actuator 130 below and away from the beam 30. In this instance, the opposite end of the actuator 130 would be relocated on the subassembly 60.

Figure 3:
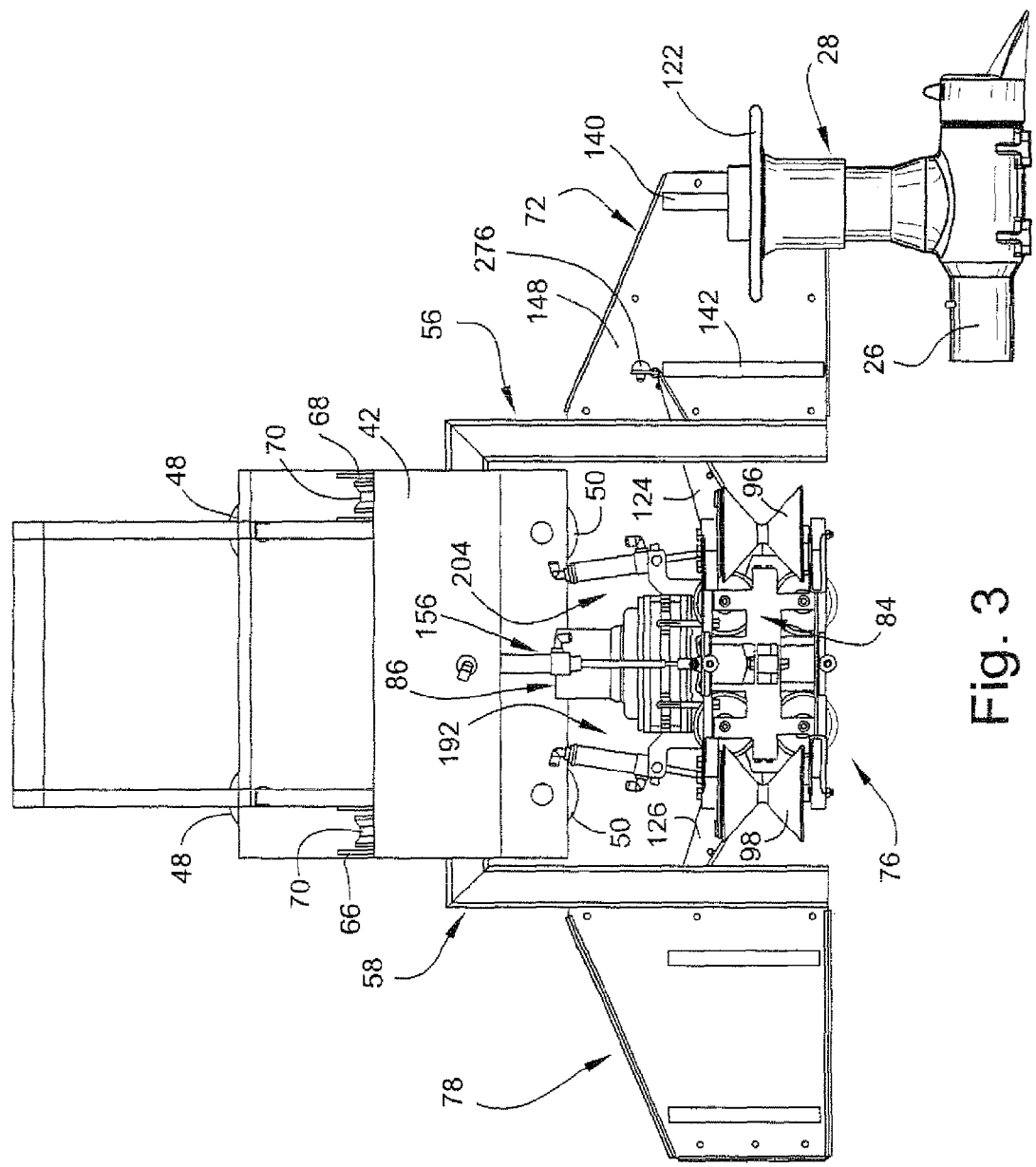
FIG. 3 is a partial side elevation, with parts removed, of the docking station shown in FIGS. 1 and 2.

As best seen in FIGS. 2-4, elongated side guide or lateral alignment sensors 140, 142 and 144, 146 are arranged vertically, in spaced relationship on the forward-facing surfaces 148, 150, respectively, of the forward guide wings 72 and 74.

A similar arrangement is provided on the rearward guide wings 78, 80) but with only two lateral alignment sensors 152, 154 shown in FIG. 4. Guide sensors 140, 142, 144, 146 on the guide wings 72, 74 (or 152, 154 on wings 78, 80 depending on direction of travel, will signal the PLC to actuate the actuators 128, 130 to move the docking station laterally along the guide rails 44, 46 to thereby more quickly align the ADS with an otherwise misaligned hydrant 28 as described further below. As already indicated above, the hydraulic assist feature is particularly useful with the larger linear-faced machines, and may not be required for smaller traveling sprinklers. In this regard, if the hydraulic-assist feature is utilized, the coil spring pairs 71, 73 and 75, 77 may be omitted.

Hydraulic actuators 156, 158 are also provided to assist in the vertical adjustment of the ADS. The actuators 156, 158 (FIGS. 2, 3) are adapted to raise or lower the docking station 76 in the event, for example, the ADS is too low as it approaches a hydrant 28 (see FIG. 7). The actuator 156 includes a cylinder 160 and piston 162 while actuator 158 includes a similar cylinder 164 and piston 166. Actuator 156 extends between a bracket 168 fixed to the subassembly 58 and the front end of the docking station housing 82 while actuator 158 extends between bracket 170 and housing 84. Height guide or vertical alignment sensors 172 and 174 are fixed to the underside of the forward and rearward horizontal guide wings 124, 126 (shown only on forward guide wing 124 in FIG. 2). These height guide sensors will sense the hydrant 28 if the ADS is below the hydrant flange 122. If this is the case, the PLC will actuate the actuators 156, 158 to raise the docking station 76 so as to more nearly align the hydrant flange 122 with the ADS passageway 120, partially defined by the axial centers of the V-track rollers 96, 98. Note that actuators 156, 158 can be operated in unison to raise the entire ADS, or independently to adjust for docking flange or riser tilt, but if operated independently, separate sets of height guide sensors would be needed.

The hydraulic assist actuators 128, 130 and 156, 158 are also used to hold the docking station firmly in place during operation. Water flowing through the irrigation valve into the connection hose and then into the linear irrigating machine produces high loads on the irrigation valve riser. These loads could stress the riser. The hydraulic assist actuators will transfer these forces away from the irrigation valve riser and into the linear irrigating machine frame.

With reference now especially to FIGS. 5-8, the housings 82, 84 and valve actuator assembly 86 of the docking station 76 also support a pair of dock stop levers 176, 178 (FIGS. 5, 6) on the forward and rearward ends, respectively, of the docking station.

The rearward dock stop lever 178 includes an elongated bar 180 pivotably mounted via pin 182 (FIG. 5) at the lower end of a yoke 184. The distal or free end 186 of the bar is cranked and mounts an axially adjustable stop 188 (FIG. 6), a stop face surface 190 of which is oriented vertically when the stop lever is in the lowered or "stop" position as in FIG. 6. The rearward dock stop lever actuator 192 includes a cylinder 194 and a piston 196. The cylinder 194 is connected at the upper end 198 of the yoke 184 and piston 196 is attached to a gusset 200 (FIG. 5) fixed to the bar 180. Note the stop actuator cylinder 194 is fixed to the yoke 184 via a trunnion swivel nut 202 (FIG. 5) that allows the cylinder 194 to adapt to the pivoting movement of the lever 178. The forward dock stop lever 176 is similarly moved between "stop" and "go" positions by a second identical dock stop actuator 204. Since the assemblies are identical, no further description of lever 176 and its actuator 204 is needed except to note that lever 176 is shown in a raised or "go" position.

Figure 9:
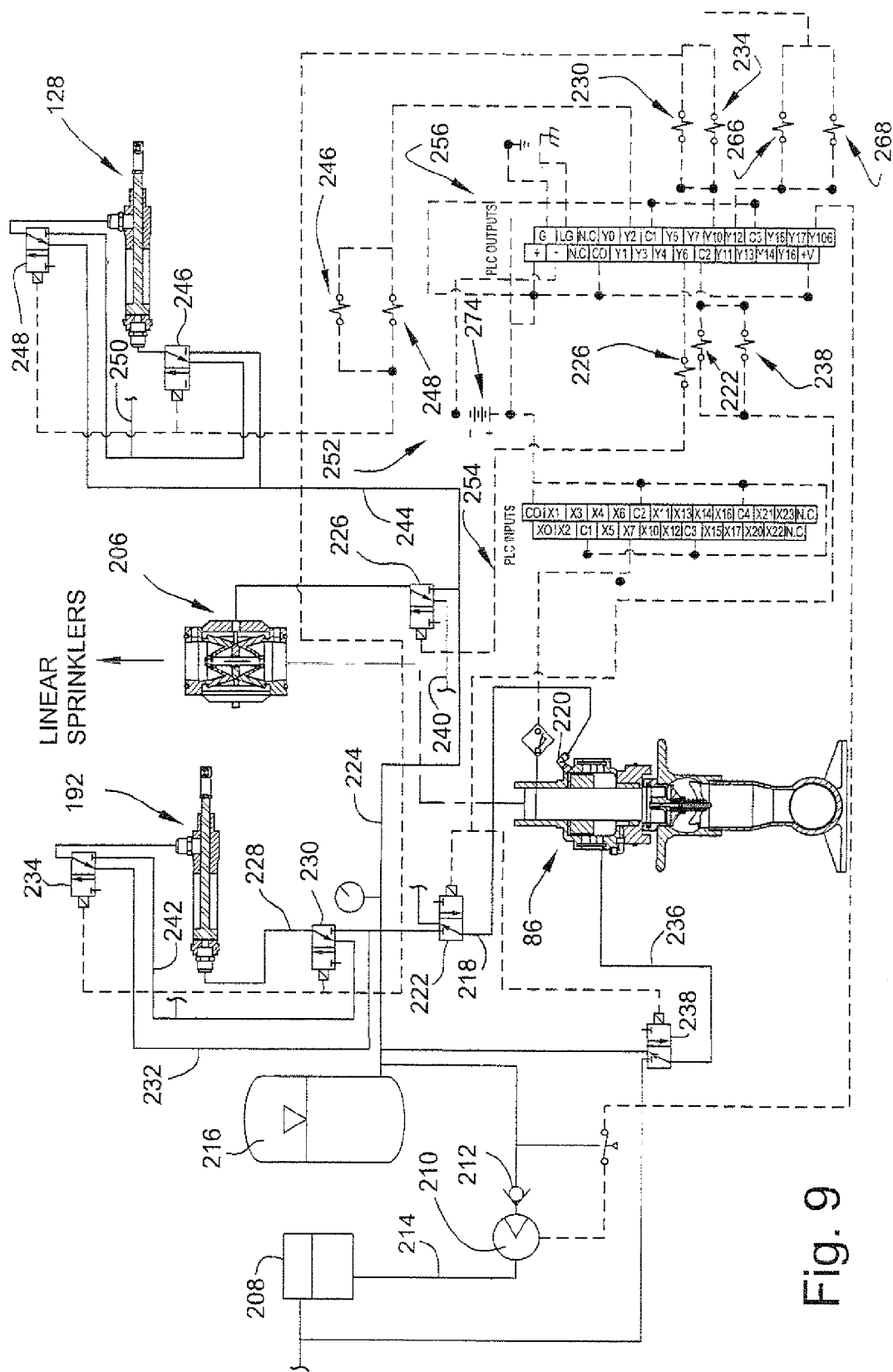
FIG. 9 is a system diagram for a traveling sprinkler utilizing the docking station in accordance with an exemplary embodiment of the invention.

With reference now to FIG. 9, the schematic control diagram illustrates the primary hydraulic and electric control circuits. Initially, it is noted that an additional upper box frame (not shown) is mounted on the supporting frame 56 above the trolley rails 44, 46. This upper frame supports the control hardware and the PLC as disclosed in the earlier-filed '494 and '296 applications.

As noted above, the control circuit in this version of the ADS is a separate oil-based hydraulic circuit, rather than the water-based circuit as disclosed in the earlier-filed applications identified hereinabove. More specifically, the main water control valve 206, the hydrant valve actuator 86 and hydraulic assist actuators 128, 130, 156, 158 and dock stop lever actuators 192 and 204 are now controlled by a separate hydraulic circuit, separate and apart from the irrigation water supply system. With specific reference to FIG. 9, a hydraulic reservoir 208 supplies oil via hydraulic pump 210 and check valve 212 in line 214 to a pre-charged pressure accumulator tank 216. The tank 216 supplies oil under pressure via line 218 to the inlet 220 of the hydrant valve actuator 86 under the control of the cylinder extend solenoid valve 222; via line 224 to the main water control valve 206 under the control of solenoid valve 226; via line 228 to the rearward dock stop lever actuator 192 under the control of the rearward dock stop lever actuator extend solenoid valve 230 or via branch line 232 to the rearward dock stop actuator retract solenoid valve 234. A similar arrangement (not shown) is provided for the forward dock stop lever actuator 204.

Hydraulic line 236 returns oil from the hydrant valve actuator 86 to the reservoir 208 under the control cylinder retract solenoid valve 238. Similarly, oil is returned to the reservoir 208 via lines 240 and 242 from the main water control valve 206 and dock stop lever actuator 192, respectively.

In addition, oil is supplied to the horizontal actuator 128 via lines 224 and 244 under the control of lateral assist extend solenoid valve 246 or lateral assist retract solenoid valve 248, with return to the reservoir 208 via line 250. A similar arrangement (not shown) is utilized to drive the horizontal actuator 130, as well as the vertical actuators 156, 158.

Note that all of the solenoid valves mentioned above are connected electrically to the PLC 252 via input bank 254 and output bank 256. In this regard, FIG. 9 shows the hydrant valve actuator extend and retract solenoids 222, 238; the main water valve solenoid 226; the rearward dock stop lever extend and retract solenoids 230, 234; the forward dock stop lever extend and retract solenoids 266, 268; and the lateral hydraulic assist actuator extend and retract solenoids 246, 248. The vertical hydraulic assist actuators and their extend and retract solenoids are not shown in FIG. 9, but are substantially the same as the lateral assist system. Note also the PLC power supply 274.

The operation of the ADS in the context of a linear feed machine will now be described in detail.

As the linear-move machine 10 is driven forward in the direction of path $P_1$ (FIG. 1), the forward dock stop lever 176 is in the retracted or "go" position, while the rearward dock stop lever 178 is in the extended or "stop" position (as in FIG. 6).

As the linear-move machine 10 approaches a hydrant 28, the hydrant flange 122 and docking station 76 are initially generally aligned by the interaction of the flange 122 with the forward side guide wings 72, 74. In the example shown in FIGS. 2 and 3 where the hydrant 28 is laterally offset to the right (looking back at the linear move machine 10 from a position downstream of the hydrant), sensors 140 and/or 142 on the vertically-oriented front guide wing 72 will be engaged by the stationary hydrant flange 122, causing the PLC 252 to signal (via the lateral hydraulic assist actuator extend and retract solenoid valves 246 and 248) the lateral assist actuator 128 to extend while at the same time, signaling (via two similar solenoid valves) lateral assist actuator 130 to retract. The docking station 76 is thus caused to move laterally along the trolley rails 44, 46 to the right (as viewed in FIG. 2) to a position where the sensors 140, 142 are no longer engaged by the flange 122, i.e., the flange 122 is now sufficiently aligned with the docking station to be received smoothly into the slot 120. At the same time, any engagement with wing 124 (in the event of vertical misalignment) will cause the docking station to move upwardly via vertical actuators 156, 158, as the docking station continues to move toward the hydrant. The hydrant flange 122 will then be engaged by the forward pair of V-track rollers 98, the tapered surfaces of which further center the flange 122 relative to the ADS so that the flange 122 is located at the smallest-diameter portion of the V-track rollers. In other words, the V-shape of the spinning rollers 98 allows the free-floating docking station 76 to crawl around the hydrant flange 122 until they are aligned. The hydrant flange 122 then slides between guide wheels 104, 106 and into the side guide channel members 97 which capture the hydrant flange in the same plane as the docking station.

As the hydrant flange 122 is captured by the docking station 76, the linear-move machine 10 continues forward travel until the hydrant flange 122 touches the extended rearward dock stop 188. More specifically, when the docking stop proximity switch 133 (part of the stop) is tripped (for example, when the flange 122 is within a few millimeters of the stop), it signals the PLC 252 in the control panel to stop the forward movement of the linear-move machine. At this point, the linear-move machine "coasts" into engagement with the dock stop 188. The hydrant flange 122 is now fully captured by the docking station 76, and the linear-move machine is in position to connect to the water supply valve. Depending on the normal operating speed of the linear-move machine, a second proximity switch may be used "upstream" of the proximity switch 133 for the purpose of effecting a reduction in speed of the linear-move machine as it approaches the hydrant.

When the docking station is fully aligned with the hydrant water supply valve, only the flange 122 is engaged with the docking station. In other words, the docking station self-aligns with the flange 122, the alignment determined by the dock stop face 190, the laterally opposed and axially spaced pairs of guide wheels 104, 106 and 108, 110, and the opposed, horizontally-oriented channel members 97 and associated side-guide wheels 99 on the interior sides of the housings 82 and 84. Note that in the fully aligned position, the flange 122 is located between and axially spaced from the forward and rearward V-track rollers.

The PLC 252 now sends a command to port oil from the pressure accumulator tank 216 through the extend on/off control solenoid valve 222 to the inlet 220 and extend diaphragm cavity, forcing the actuator piston downwardly into the hydrant valve to open the valve. At the same time, the retract on/off control solenoid valve 238 vents oil from the retract diaphragm cavity via line 236. The operation of valve actuator assembly 86 is otherwise substantial as disclosed in the '494 application, recognizing that a separate hydraulic oil circuit is utilized in the actuator assembly 86. The PLC subsequently sends a command to solenoid 226 to open the main control valve 206 so that water is free to flow via the valve 206 through the distribution pipe supported on the truss assembly 12 and to the sprinklers (not shown) suspended from the distribution pipe in conventional fashion.

After the sprinklers have run for the programmed amount of time, the PLC 252 sends a command to solenoid 226 to close the control valve 206 to prevent water from draining out of the linear-move machine 10. The PLC 252 then sends a command to vent oil from the "extend" cavity in actuator assembly 86 through the control solenoid valve 222 to the reservoir 208. This removes the downward force on the rolling diaphragm. At the same time, the PLC 252 sends a command to port oil to the "retract" cavity through the retract on/off control solenoid valve 238, pushing the piston-cylinder device back up into the actuator housing as described more fully in the '494 application. As the piston-cylinder retracts, the valve seal assembly is pushed upward by the valve springs until the valve seal seats on the valve seat and shuts off water flow as also described in the '494 application. When a proximity switch (not shown) senses the actuator assembly 86 is retracted, the PLC 252 initiates forward movement of the linear-move machine 10 to the next hydrant.

To initiate such forward movement, oil is ported through the solenoid valve 234 to hydraulic actuator 192 and vented from hydraulic actuator 192 through the solenoid valve 230. The hydraulic actuator 192 retracts its actuator piston 196 to thereby raise the stop 188 out of the path of the flange 122 to the retracted or "go" position. The linear-move machine 10 then begins to drive forward to the next hydrant. Following a programmed time delay to ensure that the docking station 76 has cleared the hydrant, the PLC 252 sends a command to solenoid valve 234 to vent its oil back to reservoir 208. Simultaneously, the PLC 252 commands solenoid valve 230 to port oil to hydraulic actuator 192. The hydraulic actuator piston 196 is forced to extend, rotating the dock stop 188 to its extended for "stop" position. The dock stop 188 is now in position to stop the docking station at the next hydrant. It will be appreciated that dock stop assembly 204 will operate in the same manner when the linear-move machine travels in the opposite direction. Thus, stop lever 176 is always retracted when the linear-move machine travels along path $P_1$, and stop lever 180 is always in the retracted position when the machine travels along path $P_2$.

In this example, the closed hydraulic system employs a standard hydraulic fluid (oil), a pump, reservoir, and filter. A water glycol fluid could also be used as the hydraulic fluid. Alternatively, a pneumatic system could be used employing a compressor, filter and reservoir. In addition, an electric jack screw or actuator could also connect to the valve actuator assembly 86 and be used to drive it up and down into the hydrant valve 28.

Still another improvement relates to the addition of stop-sensor-strips 276, 278 to the forward edges of the front and back guide wings 124, 126, respectively. Each stop sensor strip serves to shut down the apparatus by light contact or engagement with any object. This feature prevents the ADS from damaging a hydrant and/or riser if the flange 122 is higher than the ADS. The stop-strips are flexible and compressible, and thus can also be used by the operator, or anyone for that matter, as a quick shutdown switch. Specifically, only a slight squeeze of the strip is all that is required to shut down the mobile apparatus. It will be understood that other types of sensors such as sensi-switches, proximity switches, limit switch assemblies, optical switches or other suitable device, may be employed in place of the strips 276, 278. This arrangement also provides protection from field obstructions as well as safety to humans and animals in the path of travel of the mobile apparatus. Additional safety features may be employed as desired. For example, emergency stop buttons may be located on the ADS frame where they can be easily accessed by anyone in close proximity to the apparatus.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A mobile irrigation apparatus comprising:
a machine frame assembly supporting at least one sprinkler and adapted for movement in a first linear direction along a path in a field to be irrigated;
a trolley supported on said machine frame assembly and moveable along said machine frame assembly in said first linear direction;
a frame carrying a docking station supported on said trolley for movement in opposite lateral directions substantially perpendicular to said first linear direction;
said docking station resiliently suspended from said frame for floating movement in at least three mutually perpendicular directions, including in said first linear direction, said opposite lateral directions and in a vertical direction; said docking station adapted to automatically align with and as said machine frame assembly moves along the path, engage a hydrant and open a supply valve in the hydrant; and
at least a first lateral alignment power actuator arranged to move said frame and said docking station relative to said trolley in one of said opposite lateral directions in response to at least one lateral alignment sensor to thereby facilitate lateral alignment of said docking station with the hydrant.

2. The mobile irrigation apparatus of claim 1 wherein said trolley includes a pair of laterally extending guide tracks, said frame and said docking station supported for lateral movement along said tracks.

3. The mobile irrigation apparatus of claim 1 and further comprising a second lateral alignment power actuator substantially opposed to said first lateral alignment power actuator for moving said frame and said docking station in the other of said opposite lateral directions in response to another lateral alignment sensor.

4. The mobile irrigation apparatus of claim 3 wherein said first and second lateral alignment power actuators each comprise at least one hydraulic piston and cylinder device.

5. The mobile irrigation apparatus of claim 2 wherein said frame includes rollers engaged with said guide tracks to permit said frame and said docking station to roll along said guide tracks.

6. Linear water feed apparatus for use in agricultural irrigation comprising:
a wheel-mounted truss assembly supporting a plurality of individual sprinklers and adapted for movement in a specified linear direction across a field to be irrigated, the truss assembly oriented transverse to the specified linear direction;
a supply pipe arranged in said specified linear direction along or within the field to be irrigated, said supply pipe mounting a plurality of water supply hydrants at spaced locations along said supply pipe, each of said hydrants enclosing a water supply valve; and
a docking station supported on said truss assembly and adapted to engage and open successive ones of said water supply valves in said plurality of hydrants; wherein said docking station is resiliently supported for limited free-floating movement in at least said linear direction, in a vertical direction and in opposite lateral directions relative to said truss assembly; and wherein movement in said opposite lateral directions is supplemented by plural power-assist actuators.

7. The linear water feed apparatus of claim 6 wherein said docking station further comprises a first pair of substantially vertical guide wings on respective opposite sides of said docking station, extending forward of and angling laterally away from said docking station, each of said first pair of vertical guide wings including at least one lateral alignment sensor.

8. The linear water feed apparatus of claim 7 wherein said docking station further comprises a second pair of substantially vertical guide wings on respective opposite sides of said docking station, extending rearward of and angling laterally away from said docking station, each of said second pair of vertical guide wings also including at least one lateral alignment sensor.

9. The linear water feed apparatus of claim 6 wherein said docking station further comprises a first substantially horizontal guide wing extending forwardly of and angling upwardly away from said docking station, said first substantially horizontal guide wing mounting at least one vertical alignment sensor.

10. The linear water feed apparatus of claim 9 wherein said docking station further comprises a second substantially horizontal guide wing extending rearwardly of and angling upwardly away from said docking station, said second substantial horizontal guide wing also mounting at least one vertical alignment sensor.

11. The linear water feed system of claim 9 wherein said docking station supports a forward dock stop mounted for movement between operative and inoperative positions and adapted to engage said hydrants in the operative position, said docking station supports a forward dock stop mounted for movement between operative and inoperative positions, said forward dock stop always in the inoperative position when moving in said first linear direction.

12. A mobile irrigation apparatus comprising:
a machine frame assembly supporting at least one sprinkler and adapted for movement in a first linear direction along a path in a field to be irrigated;
a trolley supported on said machine frame assembly and moveable along said machine frame assembly in said first linear direction;
a frame carrying a docking station supported on said trolley for movement in at least opposite substantially horizontal and opposite substantially vertical directions; and
a first pair of power actuators arranged to move said frame and said docking station in said opposite substantially horizontal directions; and
a second pair of power actuators arranged to move said docking station in said opposite substantially vertical directions.

13. The mobile irrigation apparatus of claim 12 wherein said docking station further comprises a first pair of substantially vertical guide wings on respective opposite sides of said docking station, extending forward of and angling laterally away from said docking station, each of said first pair of vertical guide wings including at least one lateral alignment sensor; and
wherein said docking station further comprises a second pair of substantially vertical guide wings on respective opposite sides of said docking station, extending rearward of and angling laterally away from said docking station, each of said second pair of vertical guide wings also including at least one lateral alignment sensor.

14. The mobile irrigation apparatus of claim 12 wherein said second pair of power actuators are controlled to move in unison or differentially relative to each other.

15. The mobile irrigation apparatus of claim 12 wherein said docking station further comprises a first substantially horizontal guide wing extending forwardly of and angling upwardly away from said docking station, said first substantially horizontal guide wing mounting at least one vertical alignment sensor.

16. The mobile irrigation apparatus of claim 15 wherein said docking station further comprises a second substantially horizontal guide wing extending rearwardly of and angling upwardly away from said docking station, said second substantial horizontal guide wing also mounting at least one vertical alignment sensor.

* * * * *